Oct. 6, 1925.
J. A. HANLEY
1,555,840
FLEXIBLE BAND OR BELT AND THE PRODUCTION THEREOF
Filed June 18, 1923
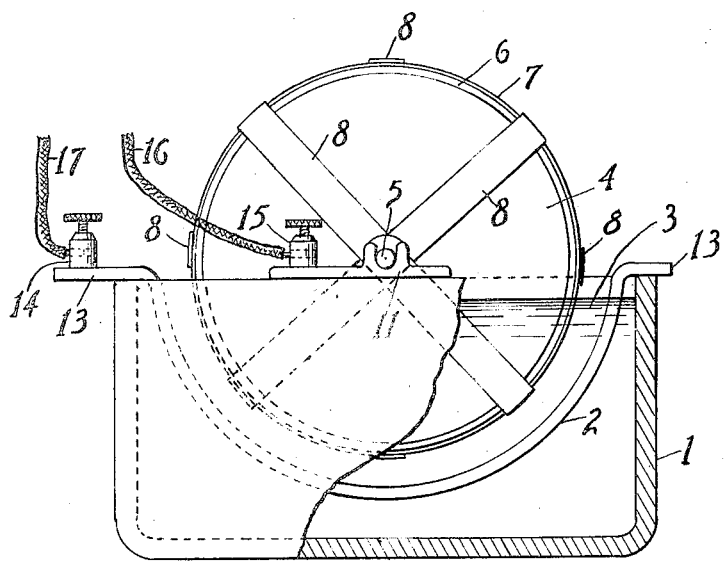
FIG 1
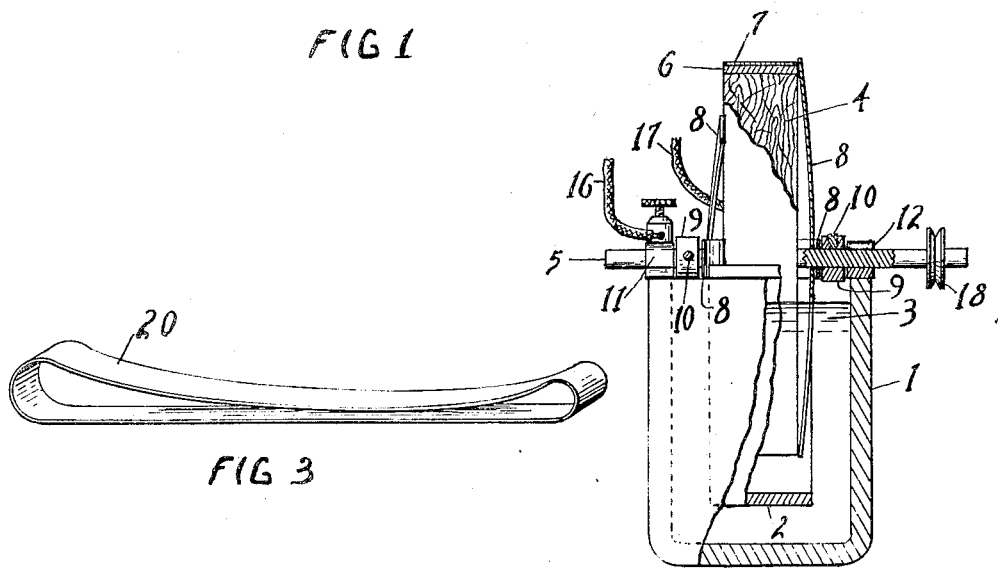
FIG 3
FIG 2
WITNESSES:
INVENTOR:
John A. Hanley
by
William A. Hardy
his ATTY.

Patented Oct. 6, 1925.

1,555,840

UNITED STATES PATENT OFFICE.

JOHN A. HANLEY, OF IRVINGTON, NEW JERSEY.

FLEXIBLE BAND OR BELT AND THE PRODUCTION THEREOF.

Application filed June 18, 1923. Serial No. 646,025.

*To all whom it may concern:*

Be it known that I, JOHN A. HANLEY, a subject of the King of Great Britain, and a resident of Irvington, in the county of Essex and State of New Jersey, have invented certain new and useful Improvements in Flexible Bands or Belts and the Production Thereof, of which the following is a description.

My invention relates to flexible bands or belts and more particularly to endless metallic belts. My invention also relates to improved apparatus and an improved method for producing such belts.

Endless metallic belts are adapted to be used for various purposes. It is particularly desirable to use such a belt charged with diamond dust or other abrasive for grinding, polishing and finishing lenses and other articles. However, it is not practicable to use for such a purpose an endless metallic belt formed by soldering or welding together the ends of a flexible metallic strip, and where the latter is very thin it is almost impossible to produce an endless belt in this manner.

The principal object of my invention is to provide an improved form of endless metallic belt which is of substantially uniform strength and substantially homogeneous in structure throughout, and which is free from the weaknesses, defects and imperfections likely to be present in an endless belt formed by soldering, welding or otherwise securing together the ends of a flexible metallic band or strip.

Further objects of my invention are to provide an improved method and an improved apparatus whereby endless metallic belts or bands free from seams or joints and of any desired width, length and thickness, may be economically and effectively produced from any metal capable of being electro-deposited.

Other objects and features of my invention will be hereinafter more fully described and claimed.

In order that my invention may be more clearly understood, attention is directed to the drawing accompanying and forming a part of this specification, and in which, Figure 1 is a view in side elevation, partly in section, of a preferred form of the electro-plating apparatus used in producing an endless metallic belt in accordance with the present invention;

Figure 2 is a view in end elevation, partly in section, of the electro-plating apparatus shown in Figure 1; and Figure 3 is a view in perspective of an endless belt such as produced by the apparatus shown in Figures 1 and 2.

The apparatus employed in producing endless metallic belts in accordance with my invention, comprises an electro-plating cell consisting of a tank or a container 1 and an anode 2 of suitable form disposed in the electrolyte or plating solution 3. Reference character 4 represents the cathode form on which the metal of which the belt is to be formed is plated. The form 4 is provided with an endless surface, it preferably being cylindrical, and may be of any suitable material, although the same is preferably formed of wood, hard rubber, glass or other non-conductive material. The form 4 is constructed so that the width of its outer cylindrical surface is equal to the width of the belt which it is desired to produce, while the length of this surface, that is the circumference of the form, is somewhat less than the desired length of such belt. Reference character 5 represents an axle or shaft to which the form 4 is suitably secured, this shaft being formed of conductive material and preferably extending through the drum or cylindrical form 4 axially thereof. The drum or form 4 is designed to be rotatably mounted on the tank 1 so that it will be partially immersed in the plating bath, as shown in Figs. 1 and 2. Prior to thus mounting the form 4 on the tank 1, however, the outer cylindrical surface thereof is coated with a layer of wax or wax-like material, preferably by slowly rotating the form in said material when the latter is in a molten condition. After the cylindrical surface of the drum 4 has been thus coated with a sufficient thickness of the wax or wax-like material, the latter is hardened by cooling, or by permitting the same to cool, and said layer is then turned down and finished to size. A very thin surface coating 7 of graphite or other suitable conductive material is then applied to the layer 6 of wax or wax-like material, this conductive material preferably being applied in the form of a powder. Suitable means are provided for electrically connecting the conductive coating 7 and the axle or shaft 5, such means preferably comprising a plurality of resilient, conductive strips 8 each of which is provided substantially midway of its ends with an opening to receive the shaft 5. The strips 8 are preferably bowed, and several of these strips are preferably mounted on the shaft 5 at each side of the drum or form 4, with their outer ends engaging the conductive coating 7 at the edges thereof. Collars 9, 9, mounted on the axle or shaft 5, are respectively pressed against the strips 8 disposed at opposite sides of the drum 4, thereby forcing the central portions of these resilient strips toward the drum and placing the strips under tension with the outer ends thereof making firm, close contact with the conductive coating 7; the collars 9, 9 then being secured to the shaft 5 in the position described, as by means of set screws 10.

The form or drum 4 is now rotatably mounted on the tank 1, preferably so that nearly one-half thereof will be immersed in the plating solution 3, as by journalling the shaft or axle 5 in suitable bearings 11 and 12 secured to the opposite side walls of the tank at the top of the latter. The anode 2 is shaped to conform to that portion of the drum 4 immersed in the electrolyte, and is provided with laterally extending end portions 13 which respectively rest on the ends of the tank 1, whereby the anode is supported so that it is substantially equi-distant at all points from the plating surface of the drum 4. Reference characters 14 and 15 represent a pair of binding posts which are respectively applied to one of the end portions 13 of the anode 2 and to an extension formed on one of the bearings 11 for the axle or shaft 5. Conductors 16 and 17 respectively connected to the binding posts 15 and 14, serve to supply current to the electro-plating apparatus or cell shown in Figs. 1 and 2 from any suitable source (not shown). The shaft or axle 5 extends outwardly beyond the bearing 12, and has secured to its extending end portion a pulley 18 adapted to be rotated, to thereby rotate the form or drum 4, as by means of a belt driven from a suitable motor (not shown). The conductive strips 8 at one side of the drum 4 are preferably staggered with reference to those on the opposite side of the drum, as clearly indicated in Fig. 1, so as to distribute the points where said strips make contact with the conductive coating 7.

In the operation of the electro-plating apparatus or cell above described, the form or drum 4 is rotated continuously at a slow rate until a layer of metal of the desired thickness has been electro-deposited over the entire outer cylindrical plating surface of the drum 4, that is, on the surface of the graphite or conductive coating 7. The strength and temperature of the plating bath, the density of the current impressed on the cell and the other conditions under which the metal is electro-deposited, are so regulated that the layer of electro-deposited metal will have the desired characteristics as to strength, toughness, density, etc. Where the apparatus is used to produce a flexible metallic belt, the temperature and strength of the plating solution, the density of the current impressed on the cell and other conditions of operation are so regulated that the endless band of metal electro-deposited on the conductive surface coating of the drum 4 will be very strong and tough and will have a high degree of coherence; and the operation of the plating apparatus is discontinued when said band is of such a thickness that it will be quite flexible upon removal thereof from the drum. The form 4 with the endless metallic band of electro-deposited metal thereon is then removed from the tank 1, and said band is then removed from the drum. The removal of the endless band of electro-deposited metal from the drum is readily effected by melting the layer 6 of wax or wax-like material. If such a layer of wax or wax-like material were not employed, it would frequently be necessary to destroy the form or drum itself in order to separate therefrom the endless band of electro-deposited metal. Accordingly, it will be apparent that this layer of wax or wax-like material not only renders the removal of the band of metal plated on the drum very easy of accomplishment, but also renders it possible to use the drum repeatedly.

The band of electro-deposited metal when removed from the drum or form 4 as described, will be in the form of an endless flexible metallic belt, such as indicated at 20 in Fig. 3, which will be substantially homogeneous in structure throughout. This belt will be wholly free from seams or joints such as are present in metallic belts formed by welding or soldering together the ends of a flexible metallic band, and will be without the defects and weaknesses likely to be present in endless belts so formed. While belts in accordance with the present invention, may be formed of any metal capable of being electro-deposited, where such belts are to be used for grinding and polishing lenses, or for a similar purpose, the same are preferably formed of copper.

While my invention is especially directed to the production of endless flexible metallic belts, it is to be distinctly understood that as to certain features thereof, it is also applicable to the production of numerous other articles formed of electro-deposited metal. It is also to be understood that the method and apparatus specifically described herein, are subject to various changes and modifications without departure from the spirit of the invention or the scope of the appended claims.

Having now described my invention, what I claim as new and desire to protect by Letters Patent is as follows:

1. A strong tough endless flexible metallic belt having a high degree of coherence and free from seams or joints.

2. An endless flexible metallic belt which is of a high degree of coherence, substantially homogeneous in structure throughout and free from seams or joints.

3. The method which consists in providing a form having an endless surface, electro-depositing metal on said surface and removing the electro-deposited metal from said form as an endless band when the same is still of such a thickness that it is flexible.

4. The method which consists in providing a form having a cylindrical surface, electro-depositing metal on said surface, discontinuing the electro-deposition of the metal when the deposited metal is still of such a thickness that it is flexible, and then removing the electro-deposited metal from said form as an endless band.

5. The method which consists in providing a form having a cylindrical surface, applying a coating of conductive material to said surface, employing said coated form as the cathode in an electro-plating cell, operating such cell so as to electro-deposit metal on said coating, and then removing the electro-deposited metal from said form as an endless band when the same is still of such a thickness that it is flexible.

6. The method of producing an endless, seamless metallic belt, which consists in providing a cylindrical form having its outer surface portion formed of conductive material, rotatably mounting said form so that the same is partially immersed in the bath of an electro-plating cell and using said form as the cathode of the cell, then operating the cell so as to electro-deposit metal on the conductive surface portion of said form while rotating the latter, and then removing the electro-deposited metal from said form as an endless band when the same is still of such a thickness that it is flexible.

7. The method which consists in providing a form having an endless surface, applying a layer of wax-like material to said surface, then applying a thin coating of conductive material to the layer of wax-like material, electro-depositing metal on the coating of conductive material, and then removing the electro-deposited metal from said form as an endless band when the same is of the desired thickness and still flexible.

8. The method which consists in providing a form having a cylindrical surface, applying a layer of wax-like material to said surface, then applying a thin coating of conductive material to said layer of wax-like material, electro-depositing metal on the coating of conductive material, and then when the endless band of electro-deposited metal thus produced has reached the desired thickness melting said wax-like material and removing said band from the form without severing the band.

9. Apparatus of the character described, comprising an electro-plating cell having a cathode form provided with an endless surface, a shaft to which said form is secured and which is rotatably mounted in such a position that said form is partially immersed in the plating bath, a layer of wax or wax-like material applied to said surface, a coating of conductive material applied to the surface of the wax or wax-like material, said shaft being electrically connected to one terminal of the cell, and means carried by said shaft and electrically connecting the latter and said coating of conductive material.

10. Apparatus of the character described, comprising an electro-plating cell having a cylindrical cathode form the peripheral portion of which is non-conductive, a rotatably mounted shaft to which said form is secured, a coating of conductive material applied to the outer cylindrical surface of said form, said shaft being electrically connected to one terminal of the cell, a resilient conductive member bearing against said coating at an edge thereof and means secured to said shaft and holding said member in a position in which it is under tension.

11. Apparatus of the character described, comprising an electro-plating cell having a cylindrical cathode form, a rotatably mounted shaft to which said form is secured, a coating of conductive material applied to the outer cylindrical surface of said form, said shaft being electrically connected to one terminal of the cell, a bowed resilient conductive member having its ends bearing against said coating at one edge thereof, and means secured to said shaft and engaged with said member intermediate its ends to thereby hold said member in a position in which it is under tension.

12. Apparatus of the character described, comprising an electro-plating cell having a cylindrical cathode form, a rotatably mounted shaft to which said form is secured, a coating of conductive material applied to the outer cylindrical surface of said form, said shaft being electrically connected to one terminal of the cell, resilient conductive members disposed at opposite sides of said form and engaging said coating of conductive material at the edges thereof, the points of engagement between said members and coating at the opposite edges of the latter being in staggered relation, and means secured to said shaft and holding said members in position in which they are under tension.

This specification signed this 14 day of June 1923.

JOHN A. HANLEY.